United States Patent
Bernert

(10) Patent No.: US 6,368,666 B1
(45) Date of Patent: Apr. 9, 2002

(54) APPARATUS AND PROCESS FOR APPLYING LIQUID OR VISCID COATING MEDIUM ONTO A COATING AREA OF A MOVING SUBSTRATE

(75) Inventor: Richard Bernert, Giengen (DE)

(73) Assignee: Voith Sulzer Papiertechnik Patent GmbH, Heidenheim (DE)

( * ) Notice: Subject to any disclaimer, the term of this patent is extended or adjusted under 35 U.S.C. 154(b) by 0 days.

(21) Appl. No.: 09/252,125

(22) Filed: Feb. 18, 1999

(30) Foreign Application Priority Data

Feb. 19, 1998 (DE) .......................... 198 07 000

(51) Int. Cl.[7] ................................. B05D 5/00
(52) U.S. Cl. .................. 427/282; 118/406; 118/301
(58) Field of Search ................. 118/213, 301, 118/304, 315, 325, 410, 419, 411; 427/284, 285, 286, 288, 282, 421, 356, 428; 101/127

(56) References Cited

U.S. PATENT DOCUMENTS

| | | | | |
|---|---|---|---|---|
| 2,119,043 A | * | 5/1938 | Cornelison | 118/301 |
| 2,382,065 A | * | 8/1945 | Kappeler | 118/301 |
| 3,354,867 A | * | 11/1967 | Pomper et al. | 118/301 |
| 3,359,941 A | * | 12/1967 | Sible | 118/301 |
| 4,559,896 A | * | 12/1985 | Bossard et al. | 118/DIG. 4 |
| 4,647,482 A | * | 3/1987 | Degrauwe et al. | 118/DIG. 4 |
| 4,675,216 A | * | 6/1987 | DuForest et al. | 118/301 |
| 4,860,686 A | | 8/1989 | Kato et al. | 118/410 |
| 5,454,870 A | | 10/1995 | Sieberth | 118/258 |
| 5,893,951 A | * | 4/1999 | Madrak et al. | 118/413 |

FOREIGN PATENT DOCUMENTS

| | | | |
|---|---|---|---|
| DE | 296 13 687 U1 | 8/1996 | B05C/5/02 |
| DE | 195 00 402 A1 | 11/1996 | B05C/3/18 |
| DE | 197 03 211 A1 | 1/1997 | B05D/1/30 |
| DE | 297 12 431 U1 | 10/1997 | B05C/5/02 |
| EP | 0 617 167 A1 | 9/1994 | D21H/23/34 |
| EP | 0 826 825 A2 | 3/1998 | D21H/23/32 |

* cited by examiner

*Primary Examiner*—Brenda A. Lamb
(74) *Attorney, Agent, or Firm*—Taylor & Aust, P.C.

(57) ABSTRACT

An apparatus applies a coating medium onto a coating area of a moving substrate. In the case of direct application, the coating medium is applied onto the outer surface of a material web such as paper or carton, or, in the case of indirect application, the coating medium is applied onto the outer surface of a transfer element such as a transfer roll, which transfers the coating medium onto the material web. The coating mechanism is provided with at least one opening for the discharge of coating medium onto the substrate. A panel element is positioned on at least one side of the two margins of the coating area a certain distance after the opening of the discharge element relative to the direction of discharge of the coating medium in order to prevent any deposits of the coating medium outside of the coating area, which thus defines the respective margins of the coating area.

17 Claims, 2 Drawing Sheets

APPARATUS AND PROCESS FOR APPLYING LIQUID OR VISCID COATING MEDIUM ONTO A COATING AREA OF A MOVING SUBSTRATE

BACKGROUND OF THE INVENTION

1. Field of the Invention

The present invention relates to an apparatus and process for applying a coating medium onto a coating area of a moving substrate.

2. Description of the Related Art

German patent document DE 296 13 687 U1 discloses an apparatus which utilizes an open-jet coating mechanism. In order to define the margins of the coating area, specially designed elements are positioned in the coating gap of the open-jet coating mechanism, thus preventing the deposit of the expelled coating medium onto the fringe areas of the material web and the support roll guiding the material web. This method of defining the margins of the coating area is, from a design perspective, very complex and expensive because separate elements must be designed in a manner so they conform to the shape of the end of the LS discharge element of the respective coating mechanism and the width of the coating gap.

SUMMARY OF THE INVENTION

In light of this shortcoming, this invention provides an apparatus which can ensure a simple and cost-effective method of defining the margins of the coating area.

In the apparatus disclosed in this application, a panel element is positioned on at least one side of the two margins of the coating area, between the opening of the discharge element and the substrate, in order to prevent any deposits of the coating medium outside of the coating area, thus defining the respective margins of the coating area.

Since the panel element disclosed in this application is no longer positioned at the end of the discharge element or in the coating gap area of the coating mechanism, it also is no longer subject to the constraints imposed by these configurations. In spite of the design-related limitations imposed by the arrangement between the discharge opening and the substrate, design consideration can be given a larger degree of latitude, which, consequently, results in a less complex construction of the panel element. This has a beneficial impact not only on the selection of materials to be used, but also on the design, as far as its cost of manufacture is concerned. Furthermore, it is feasible to apply the same type of panel element to a multitude of coating mechanisms, which again reflects in lower manufacturing costs.

The application of a panel element is essentially known from German patent application 197 03 211. It differs from the panel element discussed herein by the fact that it stretches across the entire breadth of the coating area and is only inserted into the flow of coating medium exiting the coating mechanism when a splice or glue joint is about to pass through, in order to avoid a softening of the splice due to the coating medium. Thus, the familiar panel element is not inserted into the flow of coating medium expelled by the coating apparatus during the entire coating operation.

In order to guard against splash formation of the coating medium while capturing the flow of coating medium by the panel element, causing the cleanliness and quality of the respective margins of the coating area to be compromised, it is proposed, as part of a further development of this invention, that the (at least one) panel element is positioned in a manner that allows the coating medium to impact the surface of the panel element facing away from the substrate at an acute angle.

In order to provide additional protection against contamination of the surrounding area, it is further suggested to attach an end wall to the edge of the panel element that is opposite of the edge which defines the margin of the coating area. The coating medium captured by the panel element can—due to the surface of the panel element facing away from the substrate being shaped like the outer surface of a circular cylinder—easily be guided away from the moving substrate. The coating medium that has been captured can be, for example, supplied into a collecting device, which, if so desired, is shaped in the form of a collector duct for subsequent re-use.

When at least 50 percent of the length of the panel element, as measured in the direction of movement of the substrate, is positioned upstream of the (minimum of one) discharge element having been described as being part of the coating mechanism, then the coating medium, exiting at the panel element in the opposite direction relative to the feed direction, is guided away from the substrate and could be, for example, collected for later re-use.

In order to reduce the cost of manufacture, the panel element can be designed in the form of a sheet metal construction.

In order to facilitate a change in the position of the margins, it is suggested, as part of an expanded development of this invention, to include an adjusting mechanism to provide for adjusting the (minimum of one) panel element. In doing so, the panel element can be guided, i.e., by a guide rail, onto which the panel element can be fastened by use of a clamping arrangement. The adjustment can be performed either manually or with the help of a motorized drive mechanism.

The panel element described in this application can be, for example, applied in conjunction with an open-jet coating mechanism. It is, however, equally feasible to apply the panel element in conjunction with a spray coating mechanism. Also, this invention can be applied on installations that utilize a discharge opening having a shape of a single continuous channel stretching across the entire breadth of the coating area and on installations that utilize a plurality of discharge openings in the form of spray jets. The primary stipulation for the application of the panel element is solely the requirement to have a non-diminishing spacing between the moving substrate and the discharge opening of the coating mechanism.

Another aspect of this invention addresses the process for applying a liquid or viscid coating medium onto a coating area of a moving substrate by use of an apparatus having been elaborated above in various design configurations.

With the process, as is being described here, the deposit of at least a part of the coating medium being expelled by the coating mechanism onto the substrate is avoided by use of a (minimum of one) panel element during at least part of the coating duration, which thus defines the respective margins of the coating area. With respect to the advantages and any additional options associated with the process being described by this application, reference is made to the previous discussion concerning the apparatus having been designed in accordance to this invention.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
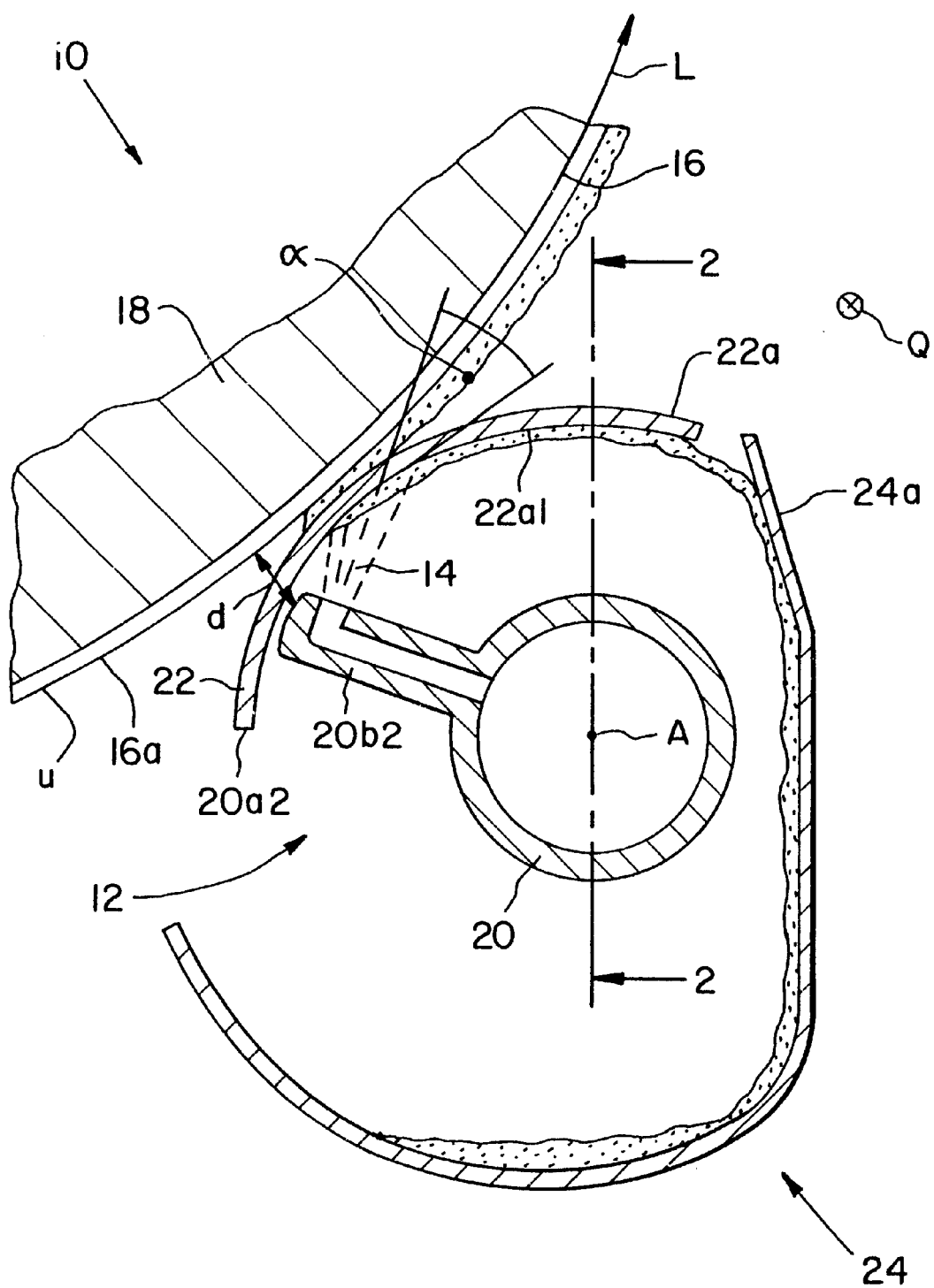
FIG. 1 is a cross-sectional side view of one embodiment of a coating apparatus of the present invention.
Figure 2:
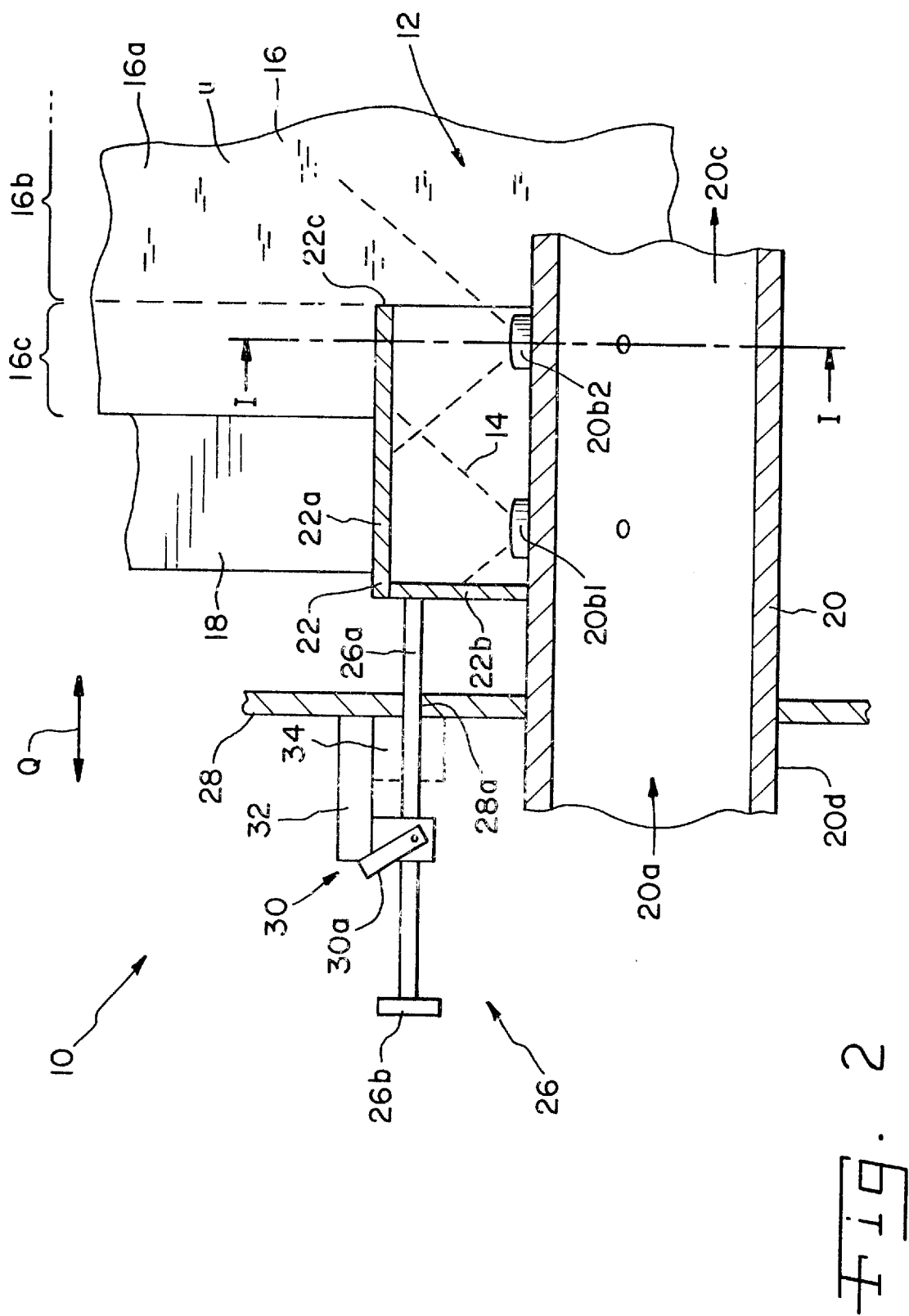
FIG. 2 is a cross-section along line II—II of FIG. 1.

Referring now to the FIGS. 1 and 2, there is shown an embodiment of an apparatus 10 for applying a coating medium onto a coating area of a moving substrate. Coating apparatus 10 includes coating mechanism 12, coating medium 14, and panel element 22. Coating mechanism 12 discharges or applies coating medium 14 onto a traversing substrate U, which is moving in the direction L as indicated by the arrow (FIG. 1).

Referring to FIG. 2, substrate U includes material web 16, outer surface 16a, which is formed of either paper or carton, coating area 16b, and uncoated margin 16c. Material web 16 is wound around support roll 18 in the area of coating mechanism 12. Support roll 18 is driven in a fashion that allows it to be engaged with material web 16 in a substantially slip free manner. An apparatus (not shown) is positioned downstream with respect to the feed direction L of material web 16 and adjacent to the coating mechanism 12, which equalizes and meters the coating medium 14 being applied onto the material web.

Coating mechanism 12 includes a distributor pipe 20 and an inlet opening 20a (FIG. 1) through which coating medium 14 is supplied to a plurality of spray elements 20b1, 20b2, etc., positioned substantially adjacent to one another, in transverse direction Q relative to material web 16 for the purpose of depositing coating medium 14 onto material web 16. Excess coating medium 14 that is not exiting spray jets 20b1, 20b2, etc., can exit the distributor pipe through outlet opening 20c (not shown in detail in FIG. 1) for subsequent re-use. The cross-sectional area of distributor pipe 20 can vary in the transverse direction Q, between the inlet opening and the outlet opening so that spray jets 20b1, 20b2, etc., are exposed to substantially the same hydrodynamic pressure. This will assure a uniform deposit of coating medium 14 onto the surface of material web 16a.

As is illustrated in FIG. 2, material web 16 is narrower in the transverse direction Q as compared to the width of support roll 18. Additionally, coating medium 14 is not being applied across the entire breadth of material web 16, as evidenced by the uncoated margins 16c on both sides of the coating area 16b on material web 16. To aid in the definition of the margins 16c, the coating apparatus 10 includes a panel element 22, having a first sheet metal unit 22a, an inner surface 22a1 (FIG. 1) configured in the shape of a partial cylinder and sharing substantially the same center line of distributor pipe 20, end wall 22b, and an edge 22c. End wall 22b, preferably also made of sheet metal, is solidly or rigidly attached to sheet metal unit 22a of panel element 22 and is slidably attached to and guided on outer surface 20d of distributor pipe 20. End wall 22b prevents any coating medium 14 that is expelled sideways out of coating mechanism 12 from impingement on substrate U.

Panel element 22 is at least partially interposed between coating mechanism 12 and material web 16, and extends transversely in direction Q across material web 16 for a certain distance. Panel element 22 thereby, at a minimum, prevents impingement of coating medium 14 being expelled through spray jets 20b1, 20b2, etc., on at least a portion of substrate U.

Referring to FIG. 2, coating medium 14 is fully captured by panel element 22, after having been expelled through spray jet 20b1, while the spray stream from spray jet 20b2 is only partially prevented from reaching the surface of material web 16. Therefore, it is edge 22c of panel element 22 that determines the boundary between coating area 16b and the margin 16c.

As shown in FIG. 1, the circular cylinder section 22a of panel element 22 is positioned between spray jets 20b1, 20b2, etc., and the material web 16 in such a way that causes the coating medium, having been captured by the panel element 22, to enter the inner surface 22a1 of the circular cylinder section 22a at an acute angle. This guards against the splash formation of coating medium 14 and contributes to a more distinct separation line between coating area 16b and margin 16c, as well as to the cleanliness of margin 16c. As a result of the kinetic energy imparted by spray jet 20b2, the coating medium flows along the inner surface 22a1 of the circular cylinder section 22a and is subsequently captured by collecting wall 24a of collecting duct 24. Coating medium accumulated in the lower area of collecting duct 24 can be recovered via a return line, which is not specifically shown in this representation.

As depicted in FIG. 1, the circular cylinder section 22a extends not only clockwise starting at spray element 20b2, but also extends in counter-clockwise direction to point 20a2 to cover an area up to approximately 50 percent of the total area provided by the panel element 22, thereby assuring that any coating medium 14 discharged in counter-clockwise direction—also referred to as "back flow"—is prevented from depositing on surface 16a of the material web 16 and is returned into collecting duct 24. This further assures a crisp and clean margin 16c.

Referring to FIG. 2, panel element 22 is attached to an adjusting mechanism by an adjusting rod which facilitates adjustment of the position of the separation line between coating area 16b and margin 16. As depicted in the embodiment of FIG. 2, adjusting mechanism 26 is designed to manually adjust panel element 22. Adjusting rod 26a is inserted through opening 28a of frame 28 and through clamping arrangement 30. Clamping arrangement 30 is attached to part 28 by a web plate 32. A clamping element (not shown here) can either be disengaged from adjusting rod 26a by activating a clamping lever 30a in order to facilitate a movement of the adjusting rod in transverse direction Q, or it can be locked to adjusting rod 26a in order to securely position panel element 22 in a desired location along the transverse direction Q. In order to move adjusting rod 26a, one person can activate handle 26b of the adjusting mechanism 26. Of course, it is also possible to facilitate an automatic adjustment of panel element 22. An appropriate servo motor acting on adjusting rod 26a is indicated in FIG. 2 by a dashed line.

It is understood that FIG. 2, depicting panel element 22, adjusting mechanism 26, and coating mechanism 12, is an approximate representation, especially as far as any dimensions in transverse direction Q of the elements and mechanisms are concerned. The design of panel element 22 can be tailored to generate the desired margins (not shown in FIG. 2) upon material web 16.

It should be noted here that an open-jet coating mechanism with a single discharge channel extending across the material web in the transverse direction can also be applied instead of coating mechanism 12 (ref. FIG. 1) that includes a plurality of spray jets 20b1, 20b2, etc. The panel element 22 of the present invention can generally be applied successfully to any coating mechanisms, provided there is a certain, non-diminishing gap d between the coating mechanism and the moving substrate U that provides sufficient room for panel element 22.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An apparatus for directly applying a coating medium onto a moving substrate in a coating area adjacent to an uncoated margin, the moving substrate having a width and a direction of movement, said apparatus comprising:

a coating mechanism having at least one discharge opening configured for discharging the coating medium in a direction of discharge onto the moving substrate, said coating mechanism including at least one discharge device and a distribution pipe for supplying the coating medium to said at least one discharge device, each said discharge device having at least one said discharge opening; and at least one panel element disposed a predetermined distance after said at least one to discharge opening in said coating mechanism relative to the direction of discharge of the coating medium, said at least one panel element being configured for preventing the coating medium from depositing onto a predetermined portion of the width of the moving substrate outside the coating area thereby defining the uncoated margin, said at least one panel element forming a partial cylinder, said partial cylinder being directly and slidably mounted on said distribution pipe.

2. The apparatus of claim 1, wherein said partial cylinder is configured so that the coating medium impacts thereupon at an acute angle.

3. The apparatus of claim 1, wherein said at least one panel element has an inner surface, said inner surface being concave in shape.

4. The apparatus of claim 1, further comprising a collecting duct configured for capturing the coating medium impacting said at least one panel element.

5. The apparatus of claim 1, further comprising an adjusting mechanism configured to change a position of said partial cylinder.

6. The apparatus of claim 5, wherein said adjusting mechanism further includes a clamping arrangement configured to lock said partial cylinder in a predetermined position.

7. The apparatus of claim 1, wherein said discharge device comprises an open-jet coating mechanism.

8. The apparatus of claim 1, wherein said discharge device comprises a spray coating mechanism.

9. The apparatus of claim 1, wherein said at least one discharge opening in said coating mechanism comprises a single, continuous channel extending substantially across the width of the moving substrate.

10. An apparatus for directly applying a coating medium onto a moving substrate in a coating area adjacent to an uncoated margin, the moving substrate having a width and a direction of movement, said apparatus comprising:

a coating mechanism having at least one discharge opening configured for discharging the coating medium in a direction of discharge onto the moving substrate, said coating mechanism including at least one discharge device and a distribution pipe for supplying the coating medium to said at least one discharge device, each said discharge device having at least one said discharge opening; and at least one panel element disposed a predetermined distance after said at least one discharge opening in said coating mechanism relative to the direction of discharge of the coating medium, said at least one panel element being configured for preventing the coating medium from depositing onto a predetermined portion of the width of the moving substrate outside the coating area thereby defining the uncoated margin, said at least one panel element forming a partial cylinder said partial cylinder being slidably mounted on said distribution pipe, said partial cylinder comprising at least one end wall element and at least one edge-defining element, each said end wall element positioned outside the coating area and said at least one edge-defining element defining the uncoated margin each said end wall element being attached to one said edge-defining element and being slidably mounted on said distribution pipe.

11. An apparatus for directly applying a coating medium onto a moving substrate in a coating area adjacent to an uncoated margin, the moving substrate having a width and a direction of movement, said apparatus comprising:

a coating mechanism having at least one discharge opening configured for discharging the coating medium in a direction of discharge onto the moving substrate, said coating mechanism including at least one discharge device and a distribution pipe for supplying the coating medium to said at least one discharge device, each said discharge device having at least one said discharge opening; and at least one panel element disposed a predetermined distance after said at least one discharge opening in said coating mechanism, relative to the direction of discharge of the coating medium, said at least one panel element being configured for preventing the coating medium from depositing onto a predetermined portion of the width of the moving substrate outside the coating area thereby defining the uncoated margin, said at least one panel element forming a partial cylinder, said partial cylinder being slidably mounted on said distribution pipe, an at least 50 percent length-wise portion of at least one said panel element extending forward from said at least one discharge opening in said coating mechanism in the direction of movement of the moving substrate, each said at least 50 percent length-wise portion being configured to guard against splash formation of the coating medium and being configured to increase the distinctness of separation between the coating area and the uncoated margin.

12. An apparatus for directly applying a coating medium onto a moving substrate in a coating area adjacent to an uncoated margin, the moving substrate having a width and a direction of movement, said apparatus comprising:

a coating mechanism having at least one discharge opening configured for discharging the coating medium in a direction of discharge onto the moving substrate, said coating mechanism including at least one discharge device and a distribution pipe for supplying the coating medium to said at least one discharge device, each said discharge device having at least one said discharge opening; and at least one panel element disposed a predetermined distance after said at least one discharge opening in said coating mechanism relative to the direction of discharge of the coating medium, said at least one panel element being configured for preventing the coating medium from depositing onto a predetermined portion of the width of the moving substrate outside the coating area thereby defining the uncoated margin, said at least one panel element forming a partial cylinder said partial cylinder being slidably mounted on said distribution pipe; and an adjusting mechanism configured to change a position of said partial cylinder, said adjusting mechanism comprising a guide rail configured for guiding said partial cylinder.

13. An apparatus for directly applying a coating medium onto a moving substrate in a coating area adjacent to an uncoated margin, the moving substrate having a width and a direction of movement, said apparatus comprising:

a coating mechanism having at least one discharge opening configured for discharging the coating medium in a direction of discharge onto the moving substrate, said coating mechanism including at least one discharge device and a distribution pipe for supplying the coating medium to said at least one discharge device, each said discharge device having at least one said discharge opening; and at least one panel element disposed a predetermined distance after said at least one discharge opening in said coating mechanism relative to the direction of discharge of the coating medium, said at least one panel element being configured for preventing the coating medium from depositing onto a predetermined portion of the width of the moving substrate outside the coating area thereby defining the uncoated margin, said at least one panel element forming a partial cylinder, said partial cylinder being slidably mounted on said distribution pipe; and an adjusting mechanism configured to change a position of said partial cylinder, said adjusting mechanism further comprising motorized drive configured for positioning said partial cylinder.

14. An apparatus for directly applying a coating medium onto a moving substrate in a coating area adjacent to an uncoated margin, the moving substrate having a width and a direction of movement, said apparatus comprising:

a coating mechanism having at least one discharge opening configured for discharging the coating medium in a direction of discharge onto the moving substrate, said coating mechanism including at least one discharge device and a distribution pipe for supplying the coating medium to said at least one discharge device, each said discharge device having at least one said discharge opening, said at least one discharge opening comprising a plurality of spray jets; and at least one panel element disposed a predetermined distance after said at least one discharge opening in said coating mechanism relative to the direction of discharge of the coating medium, said at least one panel element being configured for preventing the coating medium from depositing onto a predetermined portion of the width of the moving substrate outside the coating area thereby defining the uncoated margin, said at least one panel element forming a partial cylinder, said partial cylinder being slidably mounted on said distribution pipe.

15. An apparatus for indirectly applying a coating medium onto a moving substrate in a coating area adjacent to an uncoated margin, the moving substrate having a direction of movement, said apparatus comprising:

a transfer element associated with the substrate said transfer element having a width and a transfer coating area;

a coating mechanism having at least one discharge opening configured for discharging the coating medium in a direction of discharge onto the transfer element, said coating mechanism including at least one discharge device and a distribution pipe for supplying the coating medium to said at least one discharge device, each said discharge device having at least one said discharge opening; and at least one panel element disposed a predetermined distance after each said discharge opening in said coating mechanism relative to the direction of discharge of the coating medium, said at least one panel element being configured for preventing the coating medium from depositing upon a predetermined portion of the width of the transfer element outside of the transfer coating area, said at least one panel element forming partial cylinder, said partial cylinder being directly and slidably mounted on said distribution pipe.

16. A method for directly applying a coating medium onto a moving substrate in a coating area adjacent to an uncoated margin, the coating medium having a direction of discharge, the moving substrate having a width and a direction of movement said method comprising the steps of:

providing a coating mechanism having at least one discharge opening configured for discharging the coating medium in a direction of discharge onto the moving substrate, said coating mechanism including at least one discharge device and a distribution pipe for supplying the coating medium to said at least one discharge device, each said discharge device having at least one said discharge opening; and positioning at least one panel element a predetermined distance after said at least one discharge opening in said coating mechanism relative to the direction of discharge of the coating medium such that said at least one panel element prevents the coating medium from depositing upon a predetermined portion of the width of the moving substrate outside of the coating area thereby defining the uncoated margin, said at least one panel element forming of a partial cylinder, said partial cylinder being directly and slidably mounted on said distribution pipe.

17. A method for indirectly applying a coating medium onto a moving substrate in a coating area adjacent to an uncoated margin, the moving substrate having a direction of movement, said method comprising the steps of:

providing a transfer element associated with the substrate, said transfer element having a width and a transfer coating area;

providing a coating mechanism having at least one discharge opening configured for discharging the coating medium in a direction of discharge onto the transfer coating area of the transfer element, said coating mechanism including at least one discharge device and a distribution pipe for supplying the coating medium to said at least one discharge device, each said discharge device having at least one said discharge opening;

positioning at least one panel element a predetermined distance after said at least one discharge opening in said coating mechanism relative to the direction of discharge of the coating medium such that said at least one panel element prevents the coating medium from depositing upon a predetermined portion of the width of the transfer element outside of the transfer coating area, said at least one panel element forming a partial cylinder said partial cylinder being directly and slidably mounted on said distribution pipe; and transferring the coating medium from the transfer coating area of the transfer element onto the coating area of the moving substrate.

* * * * *

UNITED STATES PATENT AND TRADEMARK OFFICE
CERTIFICATE OF CORRECTION

PATENT NO.     : 6,368,666 B1
DATED          : April 9, 2002
INVENTOR(S)    : Richard Bernert It is certified that error appears in the above-identified patent and that said Letters Patent is hereby corrected as shown below:

Column 1,
Line 23, delete "LS" therefor.

Column 6,
Line 21, after "cylinder" insert -- , -- therefor.

Column 7,
Line 47, after "comprising" insert -- a -- therefor.

Column 8,
Line 30, after "forming" insert -- a -- therefore.
Line 36, after "movement" insert -- , -- therefor.
Line 54, after "forming" delete "of" therefor.

Column 10,
Line 3, after "cylinder" insert -- , -- therefore.

Signed and Sealed this

Twenty-fourth Day of June, 2003

JAMES E. ROGAN
*Director of the United States Patent and Trademark Office*